Aug. 9, 1955  G. E. FRANCK  2,714,868
LIQUID INDICATOR
Filed May 5, 1951
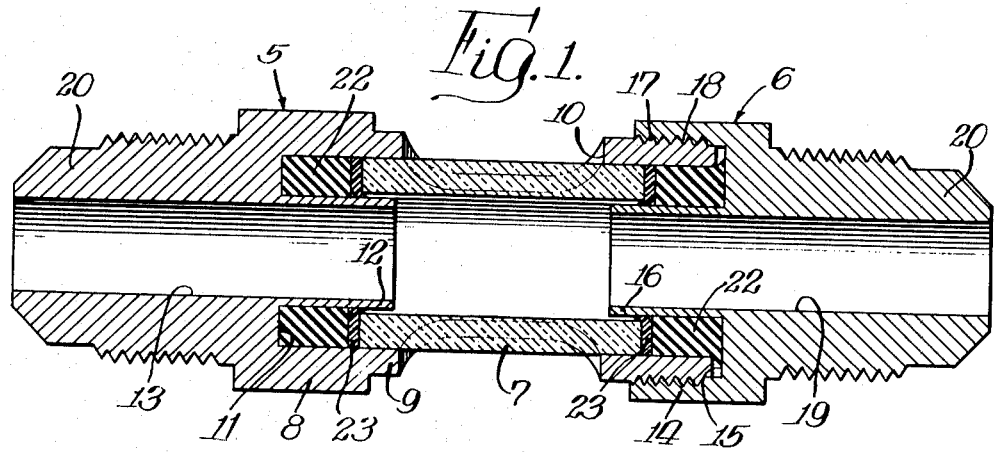
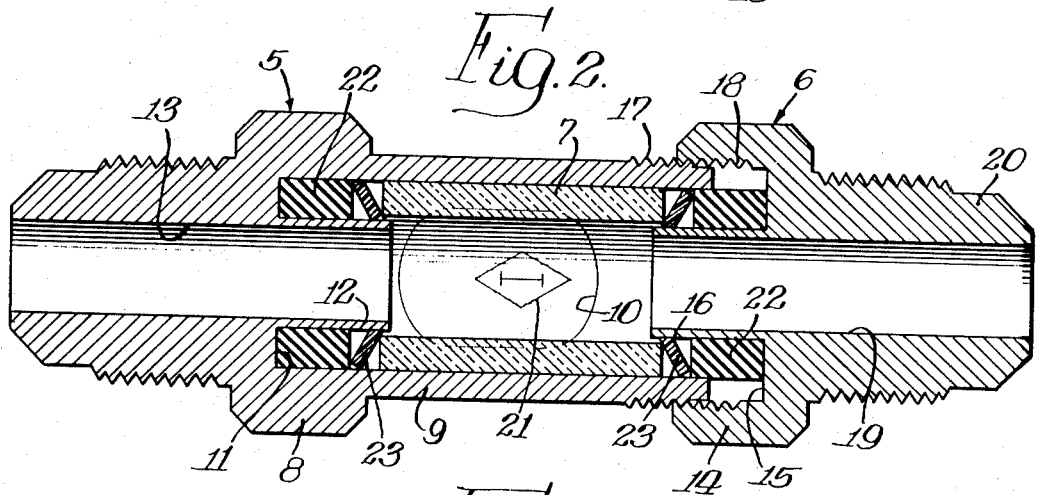
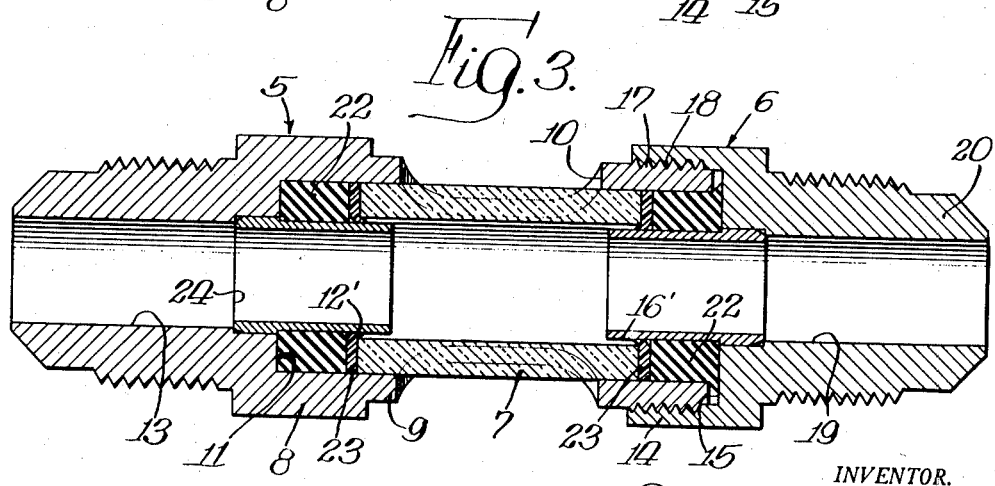
INVENTOR.
George E. Franck,
BY
Schroeder, Merriam,
Hofgren & Brady  Attys.

United States Patent Office 2,714,868
Patented Aug. 9, 1955

2,714,868

LIQUID INDICATOR

George E. Franck, Riverside, Ill., assignor to The Imperial Brass Manufacturing Company, a corporation of Illinois Application May 5, 1951, Serial No. 224,745

7 Claims. (Cl. 116—117)

The invention relates generally to a liquid indicator and more particularly to an indicator for use in refrigeration systems.

One object of the invention is to provide a new and improved indicator that is of simple construction and can be economically manufactured, yet is effectively sealable against loss of liquid.

Another object is to provide a liquid indicator having a compound seal with a portion that is impervious and inert to refrigerant and a portion that is resilient to compensate for the difference in the coefficients of expansion of the materials composing the indicator.

Still another object is to provide a liquid indicator having a sealing washer which in a preliminary stage in assembly has a conical shape and serves to center the glass tube of the indicator.

Other objects and advantages will become apparent from the following description taken in connection with the accompanying drawings, in which:

Fig. 1 is a diametrical section of an indicator embodying the features of the invention, the parts being shown in final assembled form.

Fig. 2 is a diametrical sectional view showing the indicator of Fig. 1 in a preliminary stage of assembly.

Fig. 3 is a view similar to Fig. 1 showing a slightly modified construction.

While the invention is susceptible of various modifications and alternative constructions, it is here shown in the drawings and will hereinafter be described in a preferred embodiment and one modification. It is not intended, however, that the invention is to be limited thereby to the specific disclosures made. On the contrary, it is intended to cover all modifications and alternative constructions falling within the spirit and scope of the invention as defined in the appended claims.

The indicator comprises generally a main body member 5, an auxiliary body member 6, and a tube 7 of some transparent material such as glass or one of the plastics. Herein the main body member 5 has a base portion 8 with an integral tubular extension 9 serving as a coupling medium for the two parts of the body and a protective housing for the transparent tube 7. The extension is cut away at diametrically opposite sides to form windows 10 through which the tube 7 may be viewed. Internally the base portion 8 is formed with an annular recess 11 opening inwardly. In the form of the invention shown in Figs. 1 and 2 the inner wall 12 of the annular recess 11 is formed by an integral part of the base portion. This wall will for convenience in identification be referred to as a tubular portion or tubular extension, though, as stated, it is an integral part of the base portion 8 and need not extend inwardly beyond the juncture of the base portion and the tubular extension 9 though it is actually shown as doing so. Opening axially through the base portion is a bore or passage 13.

The tubular extension 9 has an internal diameter just large enough to receive slidably therein the transparent tube 7, and the outside wall of the annular recess 11 constitutes an uninterrupted continuation of the inner surface of the tubular extension 9. The external diameter of the tubular portion 12 is somewhat smaller than the internal diameter of the tube 7 so that the tube may pass over the tubular portion 12 with slight clearance between the two.

The auxiliary body member 6, like the main body member, has a base portion 14, an annular, axially inwardly opening recess 15, and a tubular portion or extension 16 forming the inner wall of the recess 15. Means are formed on the extension 9 and in the auxiliary body member for uniting the two members. Herein the tubular extension 9 is formed with external threads 17 and the base portion 14 is formed with cooperating internal threads 18. Inasmuch as the tubular extension 9 is received within the auxiliary body member in this particular arrangement, the annular recess 15 has a radial width sufficient to accommodate the tubular extension 9 and hence greater than the radial width of the recess 11. The external diameter of the tubular portion 16, however, is the same as that of the tubular portion 12. Opening axially through the auxiliary body member and through the tubular portion 16 is a bore or passage 19.

Both the main and the auxiliary body members are herein shown formed with externally threaded, axially extending nipples 20 by means of which the members may be coupled to tubing or directly to some device.

As above stated, the tube 7 is of some transparent material such as glass or a plastic capable of resisting the action of refrigerants, and capable of withstanding the temperatures of the refrigerant flowing therethrough. Inasmuch as the indicator is intended to indicate the presence or absence of liquid, and since the presence of a clear liquid is difficult to determine, the tube 7 preferably carries some configuration 21 which, due to the refractive action of liquid in a tubular container, will distort the configuration when liquid is present in the tube and thereby give a readily observable indication of the presence or absence of liquid.

Inasmuch as the body members 5 and 6 are metallic and the tube 7 is of glass or plastic having a coefficient of expansion different from the metallic parts, provision must be made to permit relative movement between the tube and the body parts while yet effectively sealing the indicator against leakage. To that end there is provided at each end of the tube a compound packing composed of a pair of annular rings or washers 22 and 23. One of these, namely 22, has considerable axial dimension and a radial thickness substantially equal to the radial dimension of the recess 11. One such ring is placed in the bottom of each of the recesses 11 and 15 and is composed of material having a very high resiliency, such as synthetic rubber. For reasons presently to be pointed out, it is immaterial whether or not the material composing ring 22 is resistant to and not attacked by refrigerant. This makes the problem of finding a suitable material far less difficult and permits the employment of low-cost material.

The ring 23 is interposed between the ring 22 and the adjacent end of the tube 7. This ring must be of a material that is impervious to and not attacked by refrigerant. A preferred material having those qualities and the one of which the ring 23 herein is composed is polytetrafluoroethylene. It is immaterial that this material is very expensive and has little resiliency for, by the provision of the ring 22, the difference in expansion of the parts is taken up and the ring 23 can be relatively thin, as shown.

It is the ring 23 that is here relied upon to perform the sealing function. To that end the ring 23 has an external diameter the same as the diameter of the outer wall of the recess 11 which, as above stated, is the same as the internal diameter of the extension 9. The inner diameter of the ring 23 is slightly smaller than the external diameter of the tubular portion 12. As a consequence, in assembly of the indicator, the ring 23 does not pass freely over the tubular portion 12 but must be forced over it and somewhat distorted. This results in the ring taking the frusto-conical shape shown in Fig. 2. This construction has several advantages. In the first place, the frusto-conical position of the rings 23 serves to center the tube 7 with respect to the tubular portions 12 and thus assures a uniform clearance between the tube and the tubular portions 12. As the body members 5 and 6 are drawn together, the tube 7, of course, forces the rings 23 progressively toward the strictly transverse position of Fig. 1. As an incident to such forcing of each ring 23 into final position the outer periphery of the ring bears tightly against the outer wall of the recess while the inner periphery is forced even more tightly against the tubular portion 12 and is, as seen in Fig. 1, extruded into the space between the tube and the tubular portion 12, thus forming a very tight seal.

The indicator shown in Fig. 3 is the same as that shown in Figs. 1 and 2 in all respects save that the tubular portion forming the inner wall of the recesses 11 and 15 is formed by separate sleeves 12' and 16' instead of being integral parts of the body members. To that end, the passages 13 and 19 are each slightly enlarged in the base portion of the members 5 and 6 in order to form a shoulder 24 forming an abutment or limit stop against which the sleeves 12' and 16' are driven home. The sleeves have a force fit and, if necessary, may be additionally secured in position by brazing or a similar operation.

I claim as my invention:

1. A liquid indicator comprising, in combination, a main body member having a base portion, a windowed tubular extension, an internal tubular portion concentric with said windowed extension, an annular recess in said base portion in surrounding relation to said tubular portion and opening axially inwardly and a bore opening centrally through said base portion; an auxiliary body member having a base portion, an internal tubular portion, an axially inwardly opening annular recess in surrounding relation to said tubular portion and a bore opening axially of said base portion through said inner tubular portion; a ring of resilient material in the bottom of the annular recess in each of said body members; a sealing ring of material impervious and chemically inert to refrigerant overlying said first ring; a tube of transparent material receivable in the windowed tubular extension with its ends receivable in said annular recesses and bearing against said last named ring sealing the interior of the tube from communication out of the indicator; and cooperating means on said body members for securing the same together with the transparent tube in sealing engagement with said sealing rings.

2. A liquid indicator comprising, in combination, a main body member having a base portion, a windowed tubular extension, an internal tubular portion concentric with said windowed extension, an annular recess in said base portion in surrounding relation to said tubular portion and opening axially inwardly and a bore opening centrally through said base portion; an auxiliary body member having a base portion, an internal tubular portion, an axially inwardly opening annular recess in surrounding relation to said tubular portion and a bore opening axially of said base portion through said inner tubular portion; a ring of resilient, synthetic rubber in the bottom of the annular recess in each of said body members; a sealing ring of polytetrafluoroethylene overlying said first ring; a tube of transparent material receivable in the windowed tubular extension with its ends receivable in said annular recesses and bearing against said sealing ring in sealing relation to prevent escape of liquid past the sealing rings; and cooperating means on said body members for securing the same together in liquid-tight relation.

3. A liquid indicator comprising, in combination, a main body member having a windowed tubular extension, an internal tubular portion, an annular recess the internal wall of which is formed by said internal tubular portion and a passage opening axially through said internal tubular portion; an auxiliary body member having an internal tubular portion, an annular recess the inner wall of which is formed by said tubular portion and a passage opening axially through said tubular portion; a tube of transparent material receivable within said windowed tubular extension with its ends in the recesses in said body members; a seal for each end of said tube comprising a ring of resilient character in the bottom of each recess and a ring of material chemically inert and impervious to refrigerant overlying said ring of resilient material, said last named ring having an internal diameter normally slightly smaller than the external diameter of said internal tubular portion to tend to resist movement of said last named ring onto said tubular portion and thereby tend to assume a frusto-conical position; and cooperating means on said body members for securing the same together with said tube firmly held in sealing engagement with each chemically inert ring to prevent escape of liquid from within the transparent tube.

4. A liquid indicator comprising, in combination, a main body member having a windowed tubular extension, a passage opening axially through said body member, a sleeve secured in said body member concentric with said passage and forming an internal tubular portion and an annular recess opening axially inwardly the internal wall of which is formed by said sleeve; an auxiliary body member having a passage opening axially therethrough, a sleeve concentric with said passage and an axially inwardly opening annular recess the inner wall of which is formed by said sleeve; a tube of transparent material receivable within said windowed tubular extension with its ends in the recesses in said body member; a seal for each end of said tube comprising annular packing means having a resilient portion positioned in the bottom of said recesses and a first portion comprised of material impervious and chemically inert to the liquid in the indicator; and cooperating means on said body members for securing the same together with said tube firmly held in sealing engagement with each first portion of the seal preventing escape of liquid from within the transparent tube.

5. A liquid indicator as specified in claim 1, in which each of said rings of resilient material has considerable axial dimension several times the corresponding dimension of the ring of impervious material and has an external diameter in normal unstressed condition substantially no greater than the internal diameter of the windowed tubular extension.

6. A liquid indicator as specified in claim 3, in which the external annular surface of said ring of impervious material bears outwardly against the inner annular surface of said windowed tubular extension when fully seated adjacent said ring of resilient material.

7. A liquid indicator as specified in claim 1, in which each of the rings of impervious material is slightly pliable and provides an extruded portion between said internal tubular portion and said tube of transparent material when said body members are assembled in operative position.

References Cited in the file of this patent

UNITED STATES PATENTS

| 191,724 | Smith | June 5, 1877 |
| 502,073 | Hausman | July 25, 1893 |
| 859,733 | Bot | July 9, 1907 |
| 1,795,340 | Larson | Mar. 10, 1931 |
| 1,910,752 | Coles | May 23, 1933 |
| 2,196,959 | Crothers | Apr. 9, 1940 |
| 2,474,319 | Muller | June 28, 1949 |
| 2,467,312 | Jack | Apr. 12, 1949 |
| 2,520,869 | Windsor | Aug. 29, 1950 |
| 2,580,546 | Hobson | Jan. 1, 1952 |